Dec. 3, 1940.                           C. B. FRANCIS ET AL                          2,224,044
              METHOD AND APPARATUS FOR THE CHEMICAL ANALYSIS OF
                           MATERIALS BY THERMAL DECOMPOSITION
                                    Filed May 9, 1939
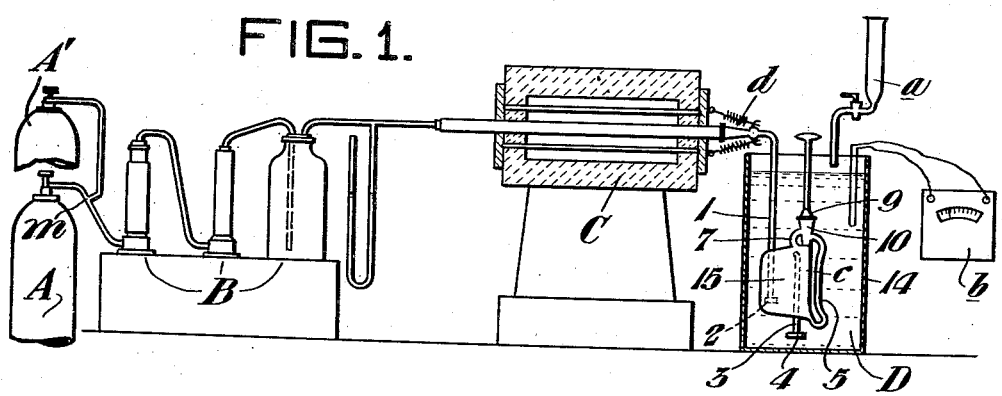
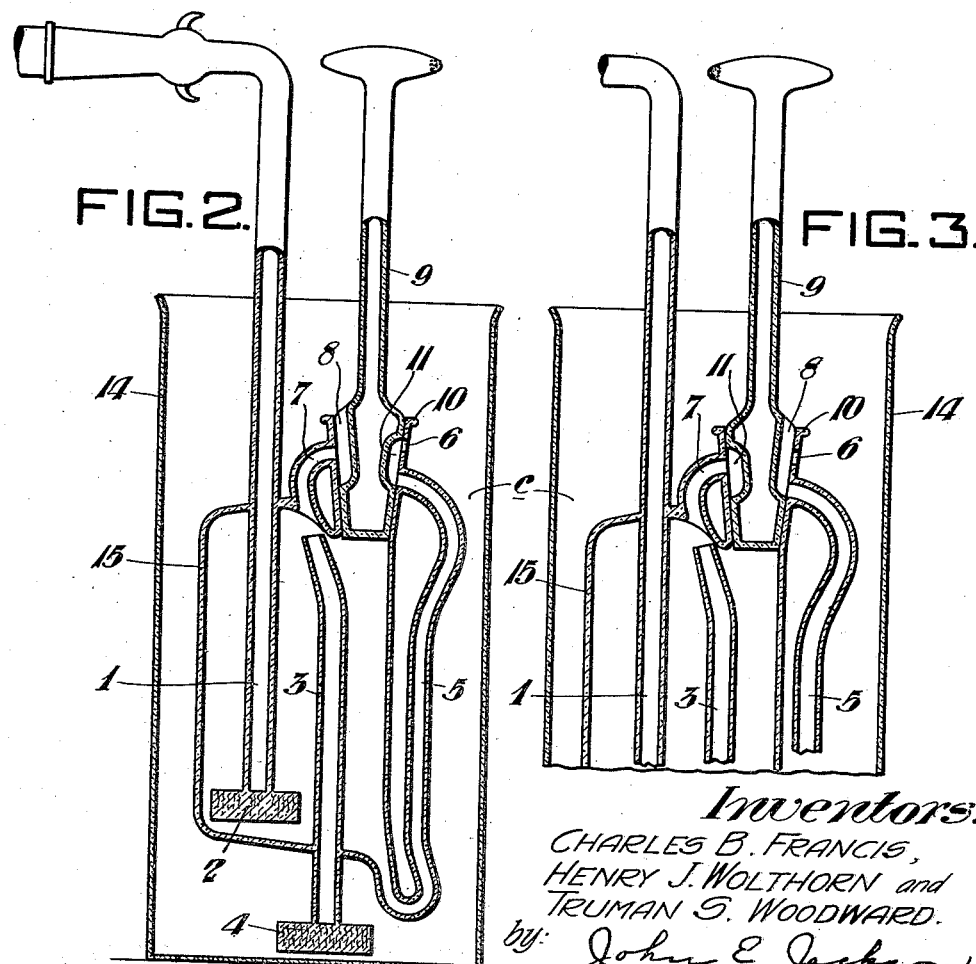
Inventors:
CHARLES B. FRANCIS,
HENRY J. WOLTHORN and
TRUMAN S. WOODWARD.
by: John E. Jackson
    their Attorney.

Patented Dec. 3, 1940

2,224,044

UNITED STATES PATENT OFFICE 2,224,044

METHOD AND APPARATUS FOR THE CHEMICAL ANALYSIS OF MATERIALS BY THERMAL DECOMPOSITION

Charles B. Francis, Pittsburgh, Pa., and Henry J. Wolthorn, Hubbard, and Truman S. Woodward, Youngstown, Ohio Application May 9, 1939, Serial No. 272,718

1 Claim. (Cl. 23—230)

This invention relates to a method and to apparatus for the determination of certain elements in materials of various kinds by application of heat to cause thermal decomposition of certain compounds under novel conditions in the presence of a current of inert or slightly oxidizing gaseous mixture, and to an apparatus and a method for reabsorbing the product from the stream of inert or slightly oxidizing gas.

As an illustration of the use to which the method and apparatus of our invention can be applied, we make use of the procedure and apparatus for the determination of sulphur in various compounds, minerals and metals, such as, for example, sulphur in barium sulphate, iron ores, pig iron and steel. However, in the thermal decomposition of materials, other elements, such as fluorine, selenium and tellurium, may be evolved and determined in much the same manner as in the determination of sulphur, upon which the following description of our method and apparatus is based.

The principles of our invention are illustrated by the accompanying drawing, in which:

Figure 1 is a sectional elevation of an apparatus set-up suitable for carrying out the invention; and Figures 2 and 3 are sectional enlargements taken from Figure 1, each showing the same piece of apparatus at different phases of its operation.

In the drawing, A is a tank of nitrogen and A' is a similar tank of oxygen, or air under pressure, the two tanks being connected at $m$ and the gas from each tank so regulated that any proportion of the two gases may be mixed as desired, oxygen being necessary in the analysis of materials, such as pig iron and steel and some others. However, it is a novel characteristic of our procedure that the oxygen is, in all events, diluted or mixed with the nitrogen or with some other chemically inert gas.

The letter B represents common equipment employed for the purification of gases prior to their use in chemical reaction; C represents a high temperature combustion furnace, specifically the furnace described in Patent No. 1,903,036 which issued to Charles B. Francis on March 28, 1933, including the combustion tube centrally located in the furnace; D represents the assembly of apparatus required to separate and determine the elements for which the material is being analyzed, by the volumetric method; $a$ being an ordinary titrating burette; $b$ a potentiometric instrument for determining the pH value of a solution in the container; $c$ the novel apparatus which constitutes the part of our invention pertaining to apparatus; and $d$ being a small device of known and suitable design for the collection of dust and for the selective absorption by known means of certain gases which it is desired to exclude from the absorber apparatus $c$.

Figure 2 illustrates arrangement of the essential parts of the absorbing apparatus constituting a part of our invention which may be successfully used and may serve to illustrate the principles of the operation and construction of the parts necessary to the successful carrying out of a determination.

Referring particularly to Figure 2, tube 1 is for the purpose of admitting gases from the furnace tube into the absorber, while part 2 consists of a bottom chamber capped by a porous glass frit produced by a known process to permit the passage of both liquids and gases. The chief function of this part in the present apparatus is to break up the gas stream from tube 1 into minute streams or bubbles and thus prevent the gas from passing in large bubbles through any liquid contained in the chamber above. Platinum discs containing very minute perforations may be substituted for the glass frit, as well as any similar substance having the same coefficient of expansion as glass. Likewise, tube 1 and part 2 may be constructed of any material inert to the action of water, bases, and acids.

As indicated by the drawing, parts 3 and 4 perform the same functions in conducting liquids and gases out of the inner chamber of the absorber as parts 1 and 2 do in admitting a gas or liquid to the inner chamber. As will be more clearly explained later, tube 5 is provided to permit the forcing of liquids out of the inner chamber and tube 7 for the escape of gases only.

Parts 9 and 10 form a novel type of two-way valve, the plug 9 being hollow and partly filled with mercury to balance the upward pressure against its bottom surface exposed to fluids contained within the inner chamber, and the wall of the plug 9 bearing indentations 8 and 11 so that when it is turned in the position shown in the main drawing Figure 2, it will permit the escape of gas through 7 and 8 and the ingress of a liquid from the outer chamber to the inner chamber through the opening 6 in the shell and tube 5, but when turned in the position shown in Figure 3, it will prevent the escape of gas from the inner chamber and permit a liquid to flow out through tube 5 and opening 6, and when turned to an intermediate position will prevent the flow of both gases and liquids except through the glass frit 2 and the tube 3 and frit 4.

To illustrate the method of procedure in making an analysis by the method of our invention, we describe in detail the determination of sulphur in steel and mineral substances. To make a determination of sulphur in steel, a proper weight of sample is transferred to a combustion boat and inserted into the refractory tube of the high temperature combustion furnace in the well-known manner of a carbon determination by combustion, the various parts of the apparatus being connected as illustrated in Figure 1.

Purified oxygen and nitrogen are admitted to the tube. All the valves in the sulphur absorbing device of Figure 2 are closed and the chamber 15 is filled with water or a solution which has been adjusted to pH5, the same liquid also filling the outer chamber 14 to a level slightly above the top of the valve. Under these conditions, the gas mixture containing the gas to be absorbed flows through the tube 1 and is separated into an extremely large number of minute streams by the fritted glass filter disc, these minute streams of gas rising as very small bubbles through the liquid to the top of absorber 15.

Under the conditions we employ to burn the sample, namely, a gas mixture with an oxygen content below that of air at a temperature of 1300 degrees to 1350 degrees centigrade (approximately 2400 degrees Fahrenheit), the sulphur in the sample is evolved into the gas stream as $SO_2$ and is largely absorbed by the water or water solution contained in the absorber chamber 15. The proportion of oxygen to the nitrogen or other inert gas should be sufficient to effect decomposition of the sample but insufficient to cause such a violent reaction as to result in spattering of the chemicals.

The mixture of gas, which may contain a trace of $SO_2$ or $SO_3$ not thus absorbed, is carried through tube 3 to the second glass frit and bubbles through the solution in the outer chamber 14. By this second operation the remainder of the gas is absorbed and held by the liquid.

At this point, we turn the valve in the top of the absorber to the position shown in Figure 3. The gas pressure then forces the liquid containing most of the $SO_2$ evolved in the determination through tube 5 and openings 11 and 6 to the outer chamber 14. Without stopping the flow of gas, we then titrate the solution by the addition of a standardized alkali to the standard of pH5, the gas stream acting as a means for stirring the solution during this titration.

As some of the acid $SO_2$ gas remains in the tube 1, tube 3, frit 2 and frit 4, as well as in the chamber 15, it is necessary to rinse these parts with some of the solution in the chamber 14. To perform this operation, we shut off the gas stream from the furnace and turn the valve to the position shown in the main drawing or Figure 2. The gas trapped in chamber 15 then escapes through tube 7 to the outlet 8, and the liquid from the chamber 14 flows through the opening 6 in the valve shell and the by-pass 11 in the plug, to the tube 5. The hydrostatic pressure also forces some of the liquid through the fritted mats 4 and 2 to fill the tube 3 and partly fill tube 1. We then turn the valve 90 degrees to close all openings, and the gas pressure forces the liquid out to 1 through frit 2 and out of tube 3 and through frit 4. When the gas is bubbling through frit 4, we turn the valve 90 degrees to the position shown in Figure 3, allowing the liquid to flow through tube 5 out into the chamber 14. Then we turn the valve 90 degrees to close all openings and permit the gas to escape through frit 4 and serve as a means for stirring or mixing the solution while it is again titrated to an acidity of pH5. From the known amount of the standard alkali solution used and its $SO_2$ equivalent, the per cent sulphur in the sample may be found by simple calculation.

With this apparatus and procedure, we are able to make an accurate determination of sulphur, the calculations being based upon theoretical factors calculated from molecular weights without the use of empirical factors established by the use of standard samples.

For example, in the analysis of a steel for sulphur, we use an 0.01N solution of sodium hydroxide, the exact concentration of which has been established by titration against an 0.01N solution of sulphuric acid that has been carefully standardized by known chemical methods. Then to check our technique and the accuracy of our method and apparatus, we analyze a known weight of a chemically pure compound, such as sodium sulphate, by the procedure described above.

Others have devised methods and apparatus for the determination of sulphur in iron and steel by combustion in oxygen, but they have been found to possess inherent sources of error that have not heretofore been overcome. Through our experiments, we have discovered that most of the causes for error are overcome by burning the metal in an atmosphere containing oxygen diluted with an inert gas, and that the other sources of error are overcome by the use of the absorber described as a part of our invention, and by titrating the absorbed oxide of sulphur potentiometrically.

For the determination of sulphur in iron ores and other minerals not containing elements which are volatilized at high temperature and which cannot be separated from a gas stream containing $SO_2$ by known means, we proceed as follows: A suitable analytical sample is weighed and transferred to the boat which is then inserted into the tube of the furnace. We then introduce a stream of nitrogen if the mineral contains no combustible matter. If the mineral contains combustible matter that should be burned to facilitate the analysis, a limited portion of oxygen in the cheapest form, such as purified air, is added with the nitrogen. This gaseous mixture is passed through the tube of the furnace and through the special absorbing device which is manipulated for the determination of sulphur as described above for the determination of sulphur in iron and steel. The flow of the gas is continued until all the sulphur carried by the sample has been evolved and absorbed in the special absorbing apparatus. The time required varies for different substances and according to the amount of sulphur the substance contains and the form in which it is chemically combined. We have encountered no substance that required a longer time than 30 minutes.

In any case, the time required for analyzing an unknown substance is readily ascertained by proceeding as follows: The gaseous mixture is passed through the apparatus for a period of at least 15 minutes when the titration is conducted as described above. The gas flow is continued for another period and the titration is repeated. When all the sulphur in the sample has been evolved, passage of the gas through the water solution in the absorber causes no change in the acidity as indicated by the potentiometric apparatus.

The other constituents we have attempted to determine by this method have all been acidic. If these elements form oxides during the decomposition in the gas stream employed, which oxides cannot be separated from $SO_2$ before the gas stream reaches the absorber, any one of several different procedures may be followed to determine the sulphur and the other constituents evolved. Thus, we may titrate the total acids with a standard alkali solution, then transfer the solution to another vessel and determine one or the other by known analytical methods. From these results, the percentage of the undetermined constituent may be calculated. In another method, we may dissolve a compound in the solution contained in the special absorber which compound or reagent is capable of precipitating or otherwise removing one of the constituents from the solution, thus making its effect neutral with respect to the pH value of the solution as determined by the potentiometer.

In a similar manner, it is possible to analyze a substance for alkalies which are volatilized at temperatures below 1400 degrees centigrade (2500 degrees Fahrenheit), the change made in the procedure being that the titration is made with a standard acid solution instead of a standard alkali solution.

By a modification of the apparatus to control the exit of gases from the outer chamber 14 shown in Figure 1 so that they may be passed without loss through another absorber, it is possible to determine both sulphur and carbon with the same sample and at the same time. The $CO_2$ passes out of the solution and is absorbed in a succeeding apparatus which consists of the drying train and a suitable absorber for $CO_2$ for gravimetric determination. Similarly, by controlling the composition of the gas stream and the temperature of the reaction zone in the tube of the combustion furnace, we are able by the novel method and apparatus of our invention to effect the separation of various elements from compounds and mixtures by converting them into volatile compounds which may be absorbed in water or in another suitable liquid or in a suitable water solution contained in the special absorber of a type shown in Figures 2 and 3 which may be preceded in the train by other absorbents to remove interfering compounds. For example, silicon may be converted into the volatile silicon fluoride, arsenic, antimony, iron chromium, phosphorus and tin into their volatile chlorides.

A particularly useful application of the method and apparatus is possible in the analysis of gases. Thus, for the accurate determination of the total sulphur in a gas mixture, a measured volume of the gas is mixed with sufficient oxygen to effect complete combustion and the mixture passed through the heated tube of the furnace with the apparatus of our invention connected as shown in Figure 1, and the sulphur dioxide in the gas and which is formed from the sulphur and sulphur compounds therein, is titrated with a standard solution of sodium hydroxide as described for the determination of sulphur in steel.

Another use is its application to the determination of inert elements, such as helium, nitrogen, argon, neon, and krypton, in gases. Thus, for the accurate determination of helium and other inert elements in a fuel gas, we first fill the combustion tube (for this purpose, we use a tube of small diameter) of the furnace shown in Figure 1 with oxygen and connect to it a closed form of our absorber filled with a strongly alkaline solution of pyrogallol, and to the exit opening of the absorber, we connect a gas burette of suitable size and form to collect by known methods any gases escaping from the absorber. We then pass a measured portion of the fuel gas mixed with a proper excess of oxygen into the combustion tube and permit the products of combustion to pass into the absorber, collecting the residue of gases in the gas burette. Since the excess oxygen and the products of combustion, consisting of water, carbon dioxide, and other acidic gases, are all absorbed by the solution in the absorber, the inert gas may be readily identified by known methods, and its constituents separated if necessary, should it prove to be a mixture of two or more inert gaseous elements.

By passing the gas through a drying tube and an absorber to abstract acidic gases before passing it into the combustion tube and inserting a dehydrating tube and another to absorb $CO_2$ and other acidic gases between the combustion tube and our novel absorbing device to abstract the excess oxygen, connected to a burette as described above, a complete ultimate analysis of the gas can be made by the procedure described.

When the sulphur in a substance is in the form of sulphites or sulphates, the gas passed over the heated sample may be chemically inert because these compounds contain sufficient oxygen to produce sulphur oxides which may be absorbed and determined by titrating the absorbent liquid, the weight of the sample being, of course, predetermined. When the sulphur is elemental or in the sulphide form, for instance, it is necessary to add oxygen to the inert gas, this also being necessary to effect thermal decomposition of some substances, such as steel, for instance. The oxygen should in such instances, be proportioned to the inert gas so as to effect conversion of the sulphur to its oxide form and decomposition of the substance, without causing a violent reaction or destruction of the furnace tube.

In the following claim it is to be understood that the sulphur in the material may be in either sulphate or sulphite form or in both forms, and that the amount of sulphur present in either or both forms will be determined by the method.

We claim:

A method of quantitively determining sulphur occurring in the form of sulphates and sulphites in a material that is thermally decomposable, said method including heating a sample of said material in a chemically inert gas to a temperature causing thermal decomposition of the sulphates and sulphites, and the production of sulphur dioxide gas, absorbing the sulphur dioxide gas, and measuring the amount of the sulphur dioxide absorbed.

CHARLES B. FRANCIS.
HENRY J. WOLTHORN.
TRUMAN S. WOODWARD.